US012810243B2

(12) United States Patent
Dhar et al.

(10) Patent No.: US 12,810,243 B2
(45) Date of Patent: Nov. 24, 2026

(54) STATEFUL INVENTORY FOR MONITORING RFID TAGS

(71) Applicant: Automaton, Inc., San Diego, CA (US)

(72) Inventors: Debarun Dhar, New York, NY (US); David Stephenson, San Jose, CA (US); Joe Mueller, San Diego, CA (US); Paul Petrus, San Jose, CA (US); Ryan Milne, San Diego, CA (US)

(73) Assignee: Automaton, Inc., San Diego, CA (US)

( * ) Notice: Subject to any disclaimer, the term of this patent is extended or adjusted under 35 U.S.C. 154(b) by 84 days.

(21) Appl. No.: 18/789,002

(22) Filed: Jul. 30, 2024

(65) Prior Publication Data

US 2024/0386375 A1 Nov. 21, 2024

Related U.S. Application Data

(63) Continuation of application No. PCT/US2023/061645, filed on Jan. 31, 2023.

(Continued)

(51) Int. Cl.
*G06Q 10/087* (2023.01)
*G06K 7/10* (2006.01)

(52) U.S. Cl.
CPC ....... *G06Q 10/087* (2013.01); *G06K 7/10297* (2013.01)

(58) Field of Classification Search
CPC ......................... G06Q 10/087; G06K 7/10297
See application file for complete search history.

(56) References Cited

U.S. PATENT DOCUMENTS 6,804,578 B1 10/2004 Ghaffari
7,084,769 B2 8/2006 Bauer et al.

(Continued)

FOREIGN PATENT DOCUMENTS

WO 2023212698 A1 11/2023
WO 2023240088 A2 12/2023

(Continued)

OTHER PUBLICATIONS

Ma, Jiangang, et al. "Efficiently managing uncertain data in RFID sensor networks." World Wide Web 18.4 (2015): 819-844. (Year: 2015).*

(Continued)

*Primary Examiner* — Nathan A Mitchell
(74) *Attorney, Agent, or Firm* — Smith Baluch LLP

(57) ABSTRACT

A radio-frequency identification (RFID) tag, or tag, is affixed to a particular item and stores unique identifying information about that item. It can be queried with a reader that transmits wireless signals to the tag and receive the tag's responses, which can be correlated with information in inventory records. Conventionally, when a reader stops receiving a tag's responses to these queries, the inventory records are updated to show that the tag and associated item have been removed from the inventory. But a tag can stop producing detectable response for other reasons, including being too close to other tags, so simply removing the tag and item can lead to inaccurate inventory records. Stateful inventory technology address this problem by maintaining and transitioning tags among different states, including a stale state for tags that have not been read recently, depending on when and where the tags were last read.

36 Claims, 8 Drawing Sheets

Related U.S. Application Data

(60) Provisional application No. 63/304,760, filed on Jan. 31, 2022.

(56) References Cited

U.S. PATENT DOCUMENTS

| | | | | |
|---|---|---|---|---|
| 7,667,602 | B2 | 2/2010 | Ulrich | |
| 7,808,388 | B2 | 10/2010 | Kangas | |
| 8,587,411 | B1 * | 11/2013 | Diorio | G06K 7/10297 340/10.5 |
| 9,818,084 | B1 * | 11/2017 | Diorio | G06Q 10/087 |
| 10,013,860 | B2 | 7/2018 | Hewett | |
| 10,037,509 | B1 | 7/2018 | Huebner et al. | |
| 10,386,474 | B2 | 8/2019 | Hewett | |
| 10,820,171 | B2 | 10/2020 | Jones et al. | |
| 10,871,558 | B2 | 12/2020 | Hewett | |
| 11,043,093 | B2 | 6/2021 | Hewett | |
| 11,215,691 | B2 | 1/2022 | Hewett et al. | |
| 11,408,965 | B2 | 8/2022 | Hewett et al. | |
| 11,543,512 | B2 | 1/2023 | Hewett | |
| 11,915,567 | B2 | 2/2024 | Hewett | |
| 11,933,877 | B2 | 3/2024 | Hewett | |
| 12,013,474 | B2 | 6/2024 | Hewett et al. | |
| 12,117,548 | B2 | 10/2024 | Hewett et al. | |
| 12,164,048 | B2 | 12/2024 | Hewett et al. | |
| 2005/0040232 | A1 | 2/2005 | Maloney | |
| 2006/0145857 | A1 | 7/2006 | Ono | |
| 2007/0239569 | A1 | 10/2007 | Lucas et al. | |
| 2008/0174432 | A1 | 7/2008 | Ulrich | |
| 2008/0297314 | A1 | 12/2008 | Kuwako et al. | |
| 2009/0066515 | A1 | 3/2009 | Kangas | |
| 2012/0044074 | A1 * | 2/2012 | Mulla | G08B 13/2448 340/572.1 |
| 2013/0169413 | A1 * | 7/2013 | Schuessler | G08B 13/248 340/10.1 |
| 2014/0084060 | A1 * | 3/2014 | Jain | G06Q 10/087 235/385 |
| 2014/0159872 | A1 | 6/2014 | Bekritsky et al. | |
| 2017/0046707 | A1 | 2/2017 | Krause et al. | |
| 2018/0308042 | A1 * | 10/2018 | Taulbee | G06K 19/0721 |
| 2019/0019139 | A1 * | 1/2019 | Belstner | G06K 7/10128 |
| 2019/0124487 | A1 | 4/2019 | Jones et al. | |
| 2020/0372442 | A1 | 11/2020 | Tennill et al. | |
| 2020/0374672 | A1 * | 11/2020 | Tennill | G06Q 10/087 |
| 2021/0082277 | A1 * | 3/2021 | Riggert | G08B 13/246 |
| 2021/0199748 | A1 * | 7/2021 | Hewett | G06Q 10/087 |
| 2021/0364625 | A1 * | 11/2021 | Li | G01S 7/0232 |
| 2023/0094353 | A1 * | 3/2023 | Iwase | G06Q 10/087 705/28 |
| 2024/0046211 | A1 | 2/2024 | Hewett et al. | |
| 2024/0193381 | A1 | 6/2024 | Brown, III et al. | |
| 2024/0273986 | A1 | 8/2024 | Hewett | |
| 2024/0295623 | A1 | 9/2024 | Hewett et al. | |
| 2024/0302522 | A1 | 9/2024 | Hewett | |
| 2024/0330614 | A1 | 10/2024 | Mueller et al. | |
| 2024/0330619 | A1 | 10/2024 | Morse et al. | |
| 2024/0386375 | A1 | 11/2024 | Dhar et al. | |

FOREIGN PATENT DOCUMENTS

| | | | |
|---|---|---|---|
| WO | 2023240296 | A1 | 12/2023 |
| WO | 2023250401 | A1 | 12/2023 |
| WO | 2024196837 | A1 | 9/2024 |

OTHER PUBLICATIONS

International Search Report and Written Opinion in International App. No. PCT/US2023/061645 mailed Jul. 6, 2023, 26 pages.

Zhang et al., "Reduction of Proximity Effects on UHF Passive RFID Systems by Using Tags With Polarization Diversity," IEEE Transactions on Antennas and Propagation, vol. 63, No. 5, May 2015, 8 pages.

Extended European Search Report in European App. No. 23747965.4 mailed Jun. 17, 2025, 11 pages.

* cited by examiner

STATEFUL INVENTORY FOR MONITORING RFID TAGS

CROSS-REFERENCE TO RELATED APPLICATION(S)

This application is a bypass continuation of International Application No. PCT/US2023/061645, filed Jan. 31, 2023, which in turn claims the priority benefit, under 35 U.S.C. 119(e), of U.S. Application No. 63/304,760, filed Jan. 31, 2022. Each of these applications is incorporated herein by reference in its entirety for all purposes.

BACKGROUND

A radio-frequency identification (RFID) tag is a small transponder that is usually pre-programmed to emit a unique identification signal in response to a query or interrogation signal from an RFID tag reader. A passive RFID tag includes a microchip with a small memory and a coil or antenna that is powered by the interrogation signal itself. The interrogation signal usually starts with a continuous-wave (cw) tone that charges the microchip via the coil or antenna. The RFID tag reader modulates a portion of the interrogation signal with a query or command for the RFID tag. The coil or antenna in the RFID tag backscatters a version of the cw tone in response to the query or command modulated with information, such as an Electronic Product Code (EPC) or other unique identifier, stored in the memory. The RFID tag reader detects the backscattered signal, also called a reply or response, and may update a database based on the information from the RFID tag.

RFID tags are used to identify and track objects in warehouses, stores, and other spaces or environments. They are inexpensive and easy to manufacture; for example, the microchip and antenna can be printed on a piece of paper with an adhesive backing, that sticks onto an item. In a clothing store, for example, there may be a passive RFID tag on the price tag of each article of clothing for sale inside the store. A database stores each RFID tag's unique identifier and information about the article of clothing that the RFID tag is attached to. By querying the RFID tags with one or more readers dispersed throughout the store, a person can determine and track the store inventory, which is often considered to be a complete list of the items available for sale (i.e., the items received minus the items sold or otherwise taken from the store). The system may even be able to locate the tagged item within a certain part of the store by sensing the power levels and/or angles of arrival of the tag's response with RFID readers at different positions within the store. Readers at the checkout or exit can be used to track items as they leave the store, e.g., for automatic checkout or loss prevention. Similarly, readers in the stockroom can be used to track items as they arrive at the store and are placed on the sales floor.

One challenge with using RFID technology in stores, warehouses, and other spaces or environments with many surfaces is getting sufficient power from the RFID reader to a tag due to shadowing, fading, ghosting, etc. Another challenge is that the response from each tag may propagate along many different paths from the tag to the reader. This phenomenon is known as multipath propagation and can result in interference that produces fading, ghosting, and/or other undesired effects that complicate efforts to estimate the tag's location from the energy received by the reader. For example, a tag may respond to a query from a reader by backscattering incident radiation e.g., in a dipole pattern. A portion of this RF energy may propagate along a direct or line-of-sight (LOS) path from the tag to the reader. Some or all of the remaining RF energy may propagate along reflected, indirect, or non-line-of-sight (NLOS) paths from the tag to the reader; that is, some or all of the remaining RF energy may reflect or scatter off one or more surfaces as it propagates from the tag to the reader. The radiation propagating along these different paths may interfere, causing fading in the signal received by the reader.

SUMMARY

These problems with detecting replies from passive RFID tags can be addressed using a method of tracking items associated with respective RFID tags entering and exiting a store with an inventory database storing states of the RFID tags. These states include an available state indicating that an item associated with an RFID tag is available for sale, a stale state indicating that a predetermined time period has elapsed since the RFID tag has responded to an interrogation signal, and a sold state indicating that the item associated with the RFID tag has been sold and/or removed from the store. The method can be executed by: changing a state of the RFID tag to the stale state in response to failing to detect a response from an RFID tag in the available state to a first interrogation signal; changing the state of the RFID tag from the stale state to the available state in response to detecting a response from the RFID tag to a second interrogation signal; and changing the state of the RFID tag to the sold state in response to detecting a sale of an item associated with the RFID tag and/or movement of the RFID tag out of the store. The state of the RFID tag comprises information about an estimated location of the RFID tag, an error associated with the estimated location of the RFID tag, and timestamp associated with a last detected response from the RFID tag. The predetermined time period can be based on the estimated location of the RFID tag and/or on the last detected response from the RFID tag.

For instance, such a method can be carried out by transmitting, by an RFID tag reader, a first interrogation signal to a first RFID tag and detecting, by the RFID tag reader, a response from the first RFID tag to the first interrogation signal. The RFID tag reader and/or a controller appliance coupled to the RFID tag reader estimates a position of the first RFID tag based at least in part on the response to the first interrogation signal. In response to detecting the response from the first RFID tag to the first interrogation signal, the controller appliance updates a state of the first RFID tag in the inventory database to the available state and to indicate the position of the first RFID tag. Next, the first RFID tag is positioned within 20 centimeters of a second RFID tag (e.g., the items associated with the first and second RFID tags are stacked on top of each other). The RFID tag reader (or possibly a different RFID tag reader) transmits a second interrogation signal to the first RFID tag, but fails to detect any response from the first RFID tag to the second interrogation signal due to tag shadowing, tag detuning, and/or re-radiation cancellation caused by the second RFID tag. The controller appliance changes the state of the first RFID tag in the inventory database from the available state to the stale state in response to the failure to detect any response from the first RFID tag to the second interrogation signal. Some time later, the RFID tag reader (or possibly a different RFID tag reader) transmits a third interrogation signal to the first RFID tag and detects a response from the first RFID tag to the third interrogation signal. The controller appliance changes the state of the first RFID tag in the inventory database from the stale state to the available state in response to detection of the response from the first RFID tag to the third interrogation signal.

Examples of this method may also include creating an entry in the inventory database for the item associated with the RFID tag in response to detecting the RFID tag at a receiving area of the store. This entry includes information about the item represented by an Electronic Product Code (EPC) stored in a memory of the RFID tag. The information about the item represented by the EPC can be verified and/or checked for correctness before adding the RFID tag/item to the inventory database.

The state of the RFID tag can be changed to an ignored state in response to receiving an indication that the item is no longer part of the inventory. Similarly, the state of the RFID tag can be changed to a missing state in response to receiving an indication (e.g., an entry from a sales associate via a computer, tablet, or smartphone) that the item cannot be found. In any event, the RFID tag stays in the inventory database (e.g., in the stale state) even if no reader detects a response from the RFID tag to interrogation signal(s) unless it is changed to the sold state or a person removes the RFID tag from the inventory database or changes its state (e.g., to missing or ignored).

Detecting the sale of the item can comprise updating a point-of-sale (POS) system to reflect that the item has been sold. Detecting the sale of the item can also include transacting the sale with a POS system. And detecting the sale of the item can also include detecting that the RFID tag has been removed from the store.

The RFID tag may be moved, oriented, or otherwise disposed so that it does not produce a detectable response to the second interrogation signal. For instance, the item can be placed in a stack of items that prevents the RFID tag from producing a detectable response to the second interrogation signal. The RFID tag can also be placed within about 20 cm or less (e.g., within 1, 2, 5, 10, or 15 cm) of another RFID tag such this other RFID tag causes tag shadowing, tag detuning, and/or re-radiation cancellation that makes detecting signals from one or both RFID tags difficult or impossible. This method can be implemented with a system that includes a plurality of RFID tag readers that transmit interrogation signals to RFID tags and receive responses from the RFID tags to the interrogation signals and a controller appliance that is operably coupled to the RFID tag readers. The RFID tag readers can transmit the interrogation signals at different repetition rates based on the time of day (e.g., fast scans during the day and slow scans at night).

The RFID tag readers may include first and second RFID tag readers configured to monitor first and second zones, respectively, of the store (e.g., a shipping/receiving area and an entrance/exit area, respectively). The first and second RFID tag readers can emit interrogation signals at different rates, at different power levels, or with different Q parameters (the RFID tag readers command the RFID tags to randomly choose one of $2^Q$ time slots for responding to the interrogation signals, where Q is the Q parameter).

The controller appliance may include a communications interface configured to communicate with at least one RFID tag reader, an inventory database storing the states of RFID tags, a processor operably coupled to the communications interface, and a non-volatile memory operably coupled to the processor and storing instructions. The instructions, when executed by the processor, cause the processor to update the states of RFID tags based on responses from the RFID tags to interrogation signals from the RFID tag reader(s) and failures by the RFID tags to respond to the interrogation signals from the RFID tag reader(s).

The controller appliance can transition an RFID tag to the sold state in response to an indication from at least one of the plurality of RFID tag readers that the RFID has been physically removed from the store. The controller appliance can transition the corresponding RFID tag to the sold state in response to an indication that the item has been sold, even if the RFID tag's starting state is the stale state or a missing state indicating that the RFID tag and associated item are missing. This indication can come from a point-of-sale (POS) system to which the controller appliance is communicatively coupled. The controller appliance can also transition a state of an RFID tag in response to a command received via an application programming interface (API). The controller appliance can keep an RFID tag in an inventory database in the stale state despite the plurality of RFID tag readers failing to detect responses from the RFID tag.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Passive RFID tags are particularly useful for tracking or monitoring items in retail stores, warehouses, or other facilities. The RFID tags are affixed to the items to be monitored and periodically queried or interrogated with RFID tag readers, also called sensors or simply readers. These RFID tag readers can be handheld or fixed in certain locations, for example, above exits and entrances to the facility. Each time a reader interrogates an RFID tag, it updates the RFID tag's status and location and the status and location of the corresponding item in a database or inventory maintained by a system controller or appliance that communicates with the reader.

Under a naïve approach to inventory control with RFID tags, if an RFID tag reader stops reading an RFID tag, then the RFID tag and corresponding item are removed from the inventory, the assumption being that the RFID tag and corresponding item have been taken out of the facility. For example, if an item is purchased, then the purchaser may take the item and RFID tag out of the store or the purchaser or a sales associate may remove or deactivate the RFID tag affixed to the item before the purchaser takes the item out of the store. As a result, the RFID tag will not appear in subsequent scans with a handheld or fixed RFID tag reader. After the RFID tag fails to appear in a predetermined number of scans or for a predetermined period of time (e.g., a day or more), then the system controller may automatically remove the RFID tag and corresponding item from the inventory.

Figure 1B:
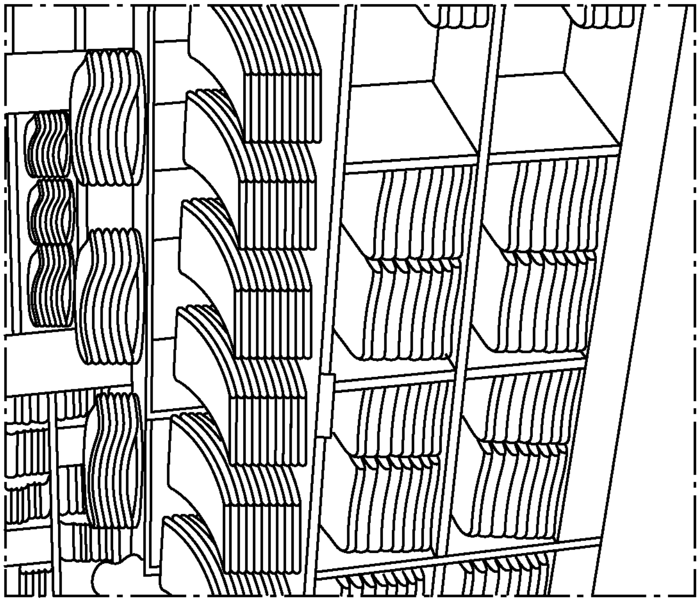
FIG. 1B shows a photograph of items of clothing tagged with RFID tags and stacked on wooden shelves on the sales floor/storefront of a retail clothing store.
Figure 1A:
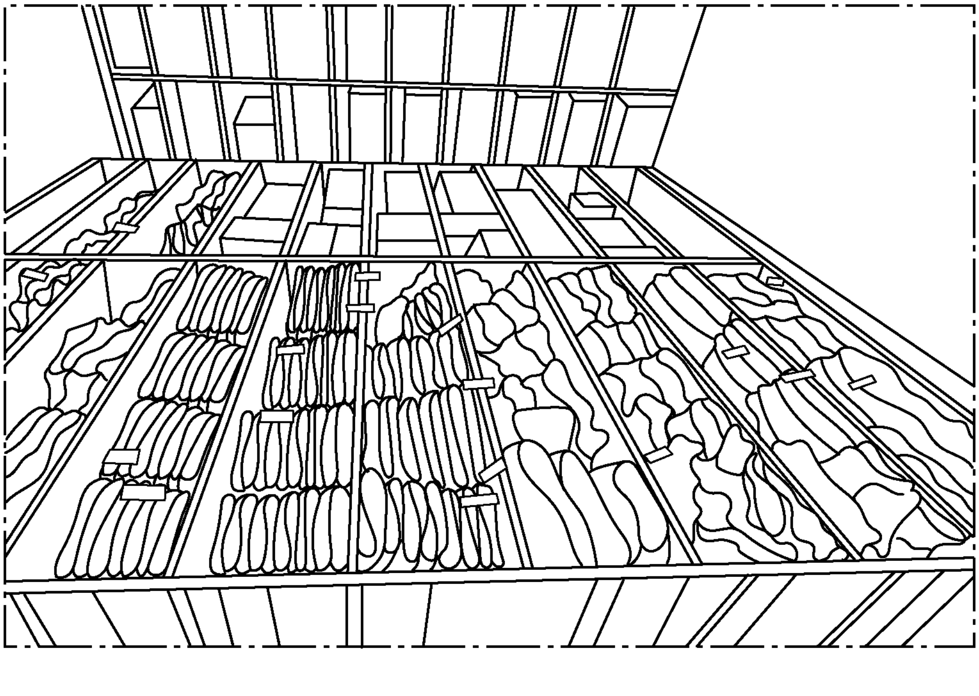
FIG. 1A shows a photograph of items of clothing tagged with radio-frequency identification (RFID) tags and stacked on metal shelves in the stockroom of a retail clothing store.

Unfortunately, RFID tags can disappear from scans by readers for reasons other than being removed from the facility. For instance, RFID tags placed on metal shelves as shown in FIG. 1A may not be read by readers because the metal shelves can block both the interrogation signals and the responses. Experiments show that placing RFID tags on metal shelves reduces the detection rate from about 99% to about 88%. Likewise, sometimes temporary obstructions, including people, shield RFID tags from RFID tag readers. A metal cart or crowd of people may prevent a reader from reading an RFID tag on the far side of the cart or crowd from the reader. In a store, a customer or sales associate may inadvertently move an RFID tag, for example, to a bottom shelf, so that it cannot be read effectively by a reader fixed to the ceiling. If the obstruction or repositioning lasts longer than the timeout period, then the RFID tag and corresponding item may be removed from the inventory even though they are still on site.

Other RFID tags can also interfere with RFID tag measurements. RFID tags that are stacked on top of each other as shown in FIGS. 1A and 1B or placed close to each other (e.g., within 1, 2, 5, or 10 cm of each other) can reduce each other's ability to be activated by and/or respond to interrogation signals from nearby readers. Without being bound by any particular theory, this degradation in RFID tag performance can be caused by tag detuning, tag shadowing, and/or re-radiation cancellation. Tag detuning in an RFID tag is caused by power loss due to an impedance mismatch, caused by a coupling to a nearby RFID tag, between the RFID tag's antenna and integrated circuit (IC). Tag shadowing and re-radiation cancellation are caused by interference between backscattered RF waves from other RFID tags and incident interrogation signals from the reader. These effects operate on different length scales and can be difficult to model and predict given the large number of ways that RFID tags can be stacked or arranged and can interact with each other. These problems stem from how passive RFID tags operate and, at present, are difficult to mitigate.

Performance Degradation in Stacked or Proximate RFID Tags

Figure 2B:
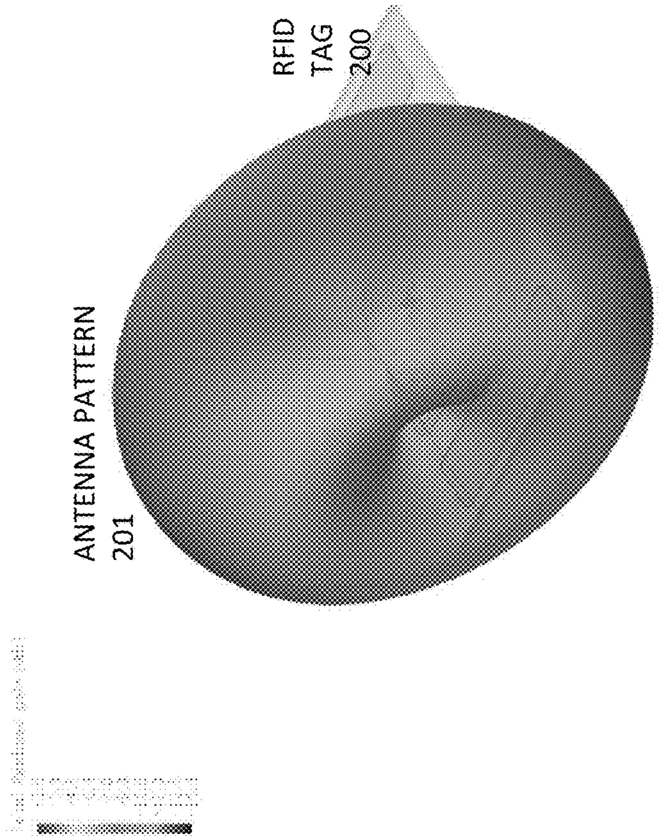
FIG. 2B shows the antenna gain pattern of the RFID tag of FIG. 2A.
Figure 2A:
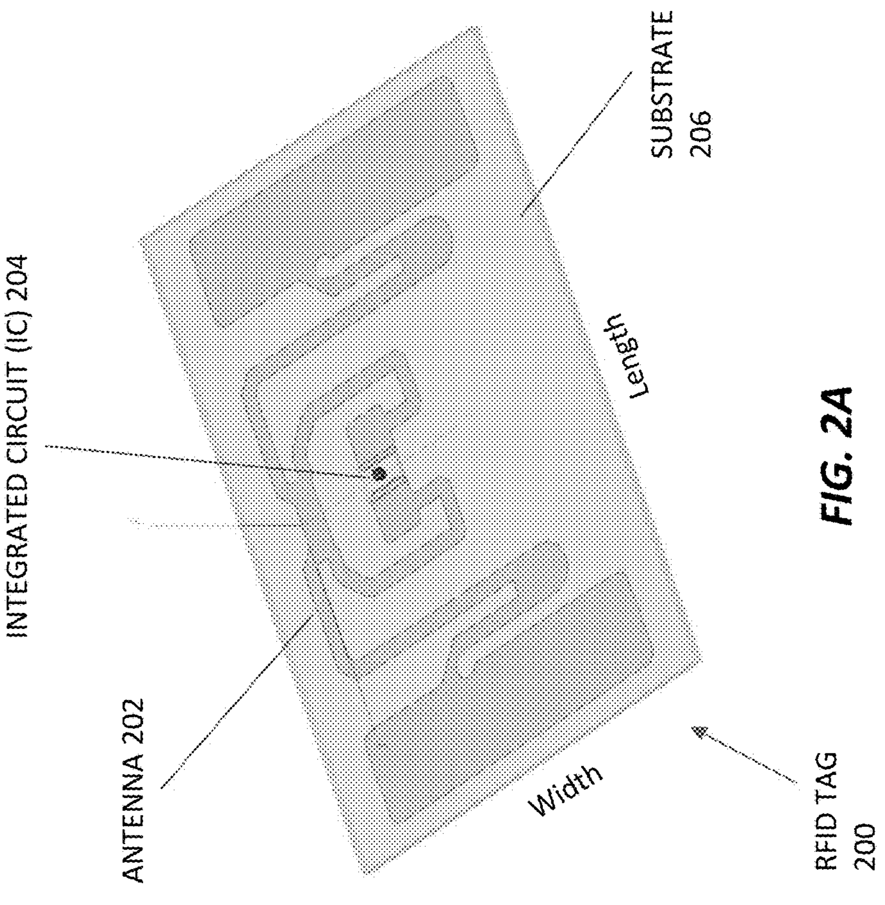
FIG. 2A shows an RFID tag.

FIGS. 2A-2D illustrate how stacking RFID tags on top of each other can degrade tag performance. FIG. 2A shows a typical RFID tag 200 with an antenna 202 coupled to an integrated circuit (IC) 204, both of which are printed or otherwise disposed on a substrate 206, such as a piece of paper or cardboard. The antenna 202 receives RF energy in the interrogation signals from the readers and backscatters some of that RF energy as the tag response. The tag 200 modulates that backscattered RF energy according to values stored in memory that is part of the IC 204.

In this example, the antenna 202 is a dipole antenna with a toroidal or donut-shaped antenna pattern 201 as shown in FIG. 2B. The antenna pattern 201, which is also called the radiation or far-field pattern, represents the directional or angular dependence of the strength of the radio waves received or emitted by the antenna 202. The antenna pattern 201 in FIG. 2B indicates that the antenna 202 has lower gain along the length of the RFID tag 200 and higher gain perpendicular to the substrate 206 and along the width of the RFID tag 200.

Figure 2C:
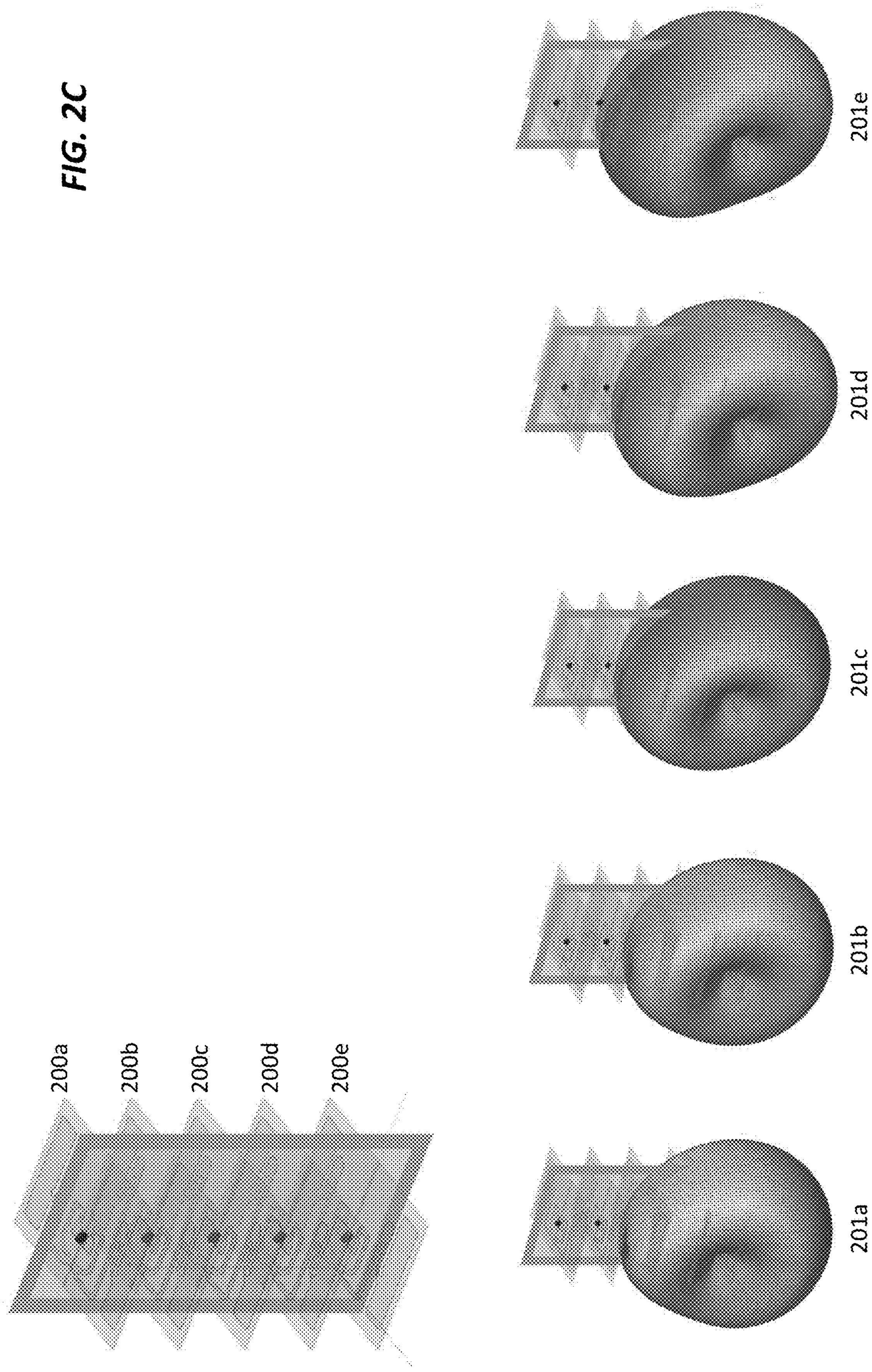
FIG. 2C shows simulated antenna gain patterns for different RFID tags in a stack of five RFID tags.
Figure 2D:
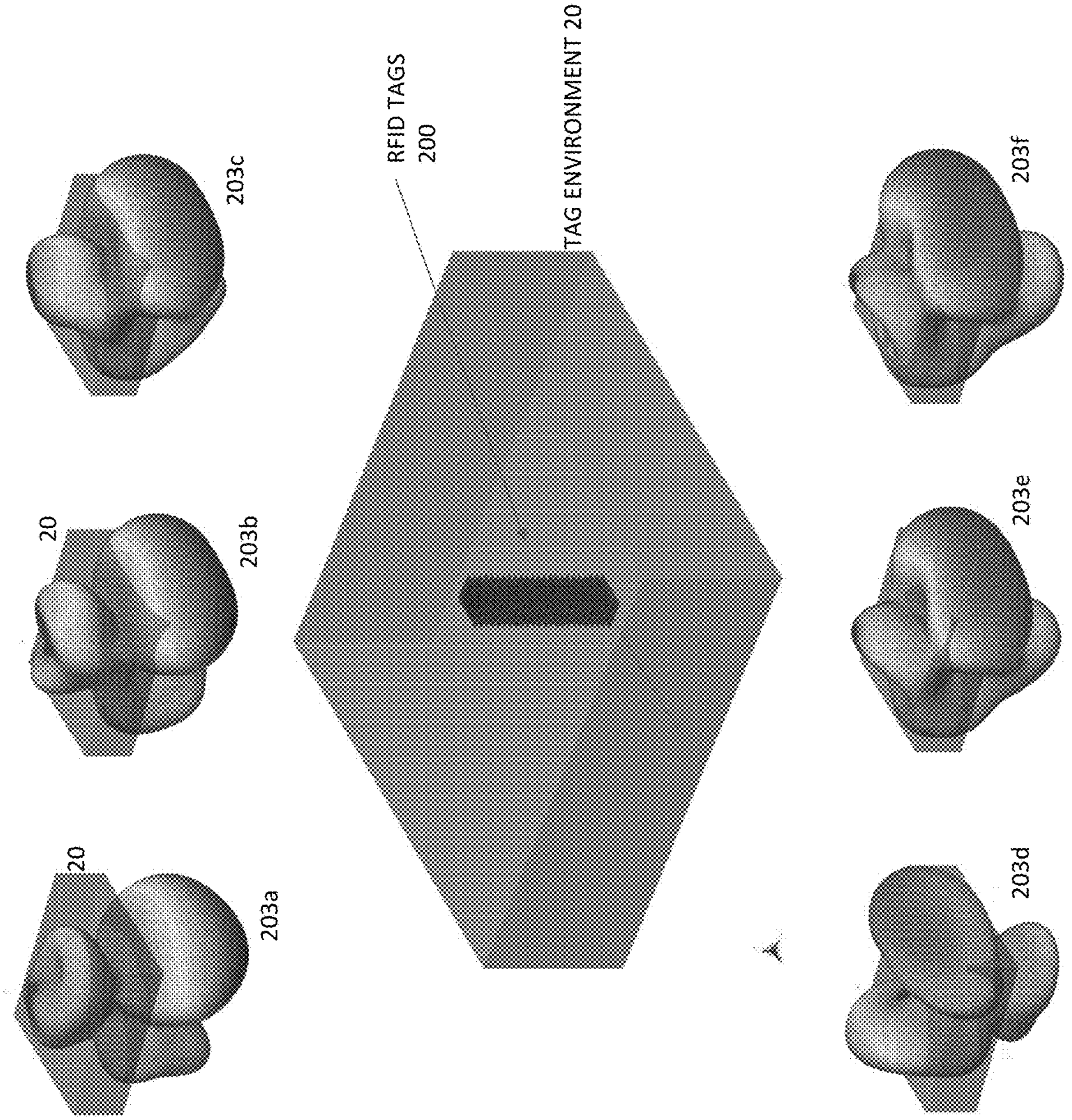
FIG. 2D shows simulated antenna gain patterns for different RFID tags in a stack of twenty-four RFID tags.

FIGS. 2C and 2D illustrate how stacking several RFID tags 200 on top of each other distorts the RFID tags' respective antenna patterns. FIG. 2C shows five RFID tags 200*a*-200*e* aligned on top of each other. Neighboring tags are separated from each other by about 1 cm, which represents the thickness of a folded piece of clothing, e.g., as shown in FIGS. 1A and 1B. FIG. 2C also shows simulated antenna patterns 201*a*-201*e* for the different tags 200*a*-200*e*, with changing shading of the radiation patterns indicating the changing gain or detuning of the dipole antenna. Each antenna pattern should be perfectly toroidal as in FIG. 2B, but tag detuning, tag shadowing, and/or re-radiation cancelation distort the antenna patterns. This distortion for each RFID tag varies with that RFID tag's position within the stack of RFID tags and can reduce the likelihood of successfully reading an RFID tag.

FIG. 2D shows that the distortion gets worse as more tags 200 are added to the stack. In FIG. 2D, there are 24 RFID tags stacked on top of each other in an environment 20, with neighboring RFID tags separated from each other by 1 cm. FIG. 2D also shows simulated antenna patterns 203*a*-203*f* for six RFID tags 200 that are at the bottom of the stack superimposed on the environment 20. These patterns are badly distorted due to tag detuning, tag shadowing, and/or re-radition cancellation. At this level of distortion, the RFID tags 200 in the bottom or middle of the stack cannot be read reliably by readers on the ceiling even though they are still in stock.

Tag detuning, tag shadowing, re-radiation cancelation, and temporary obstructions degrade the ability to maintain an accurate inventory with an RFID system. Under a naïve approach to inventory control, temporary failure to read an RFID tag may lead to the associated item being removed from the inventory even though it is still in stock. This, in turn, can lead to the inability to locate items that are actually in stock or ordering unnecessary replacements for the "missing" inventory. Other inventory problems due to or associated with temporary failures to read RFID tags include carrying extra safety stocks to offset inventory errors. Safety stock is extra inventory that a retailer carries because their inventory is not accurate; it's there because they know that their inventory is inaccurate and want to ensure they have (enough) product to sell. Safety stock is typically kept for all colors and sizes of an item, even those that are not particularly popular. This results in the retailer buying and/or storing more inventory than is actually needed and potentially discarding unsold or unwanted items.

Stateful Inventory Monitoring System

Figure 3A:
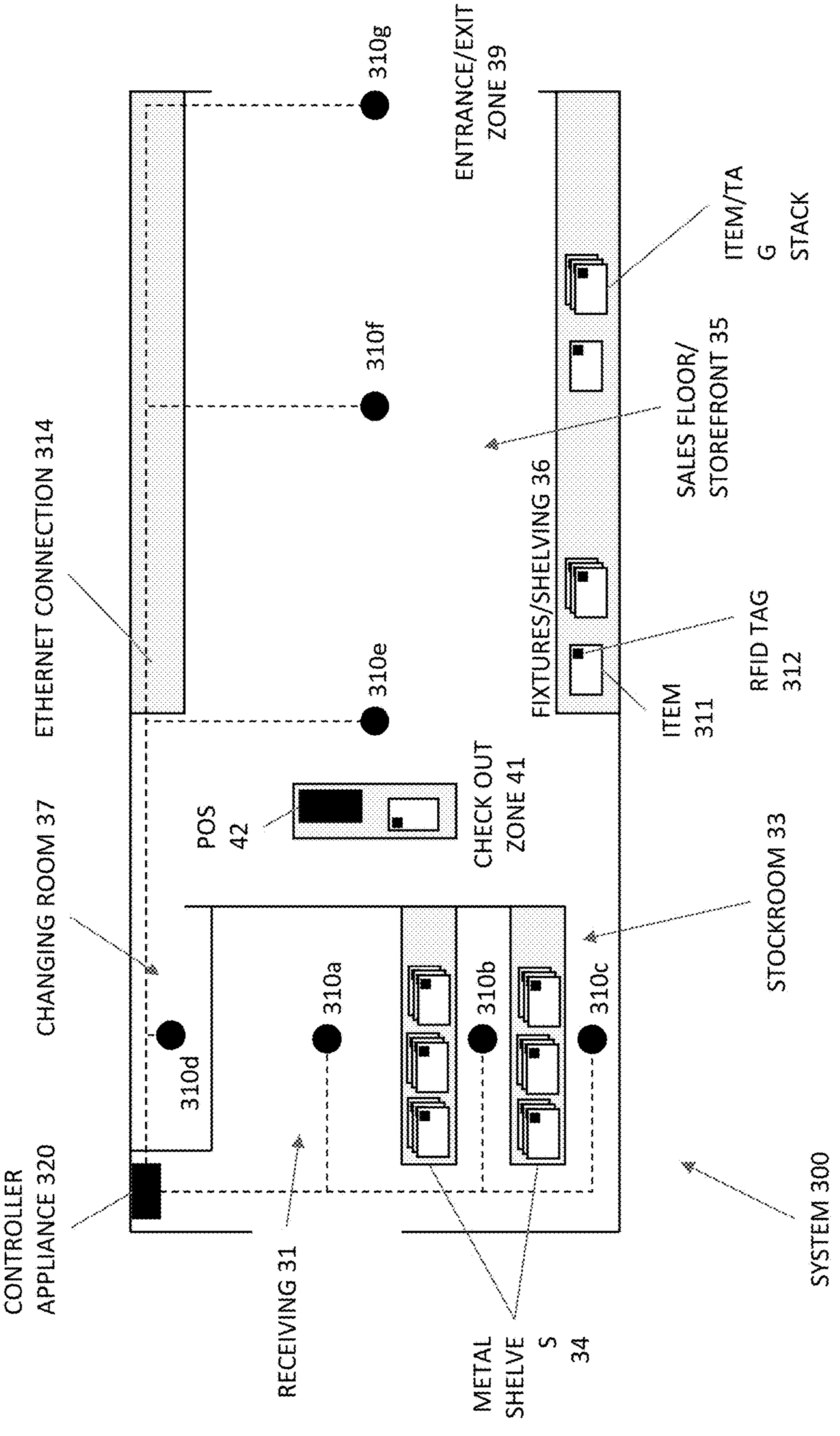
FIG. 3A illustrates an RFID tag monitoring system deployed in a retail store or similar space.
Figure 3B:
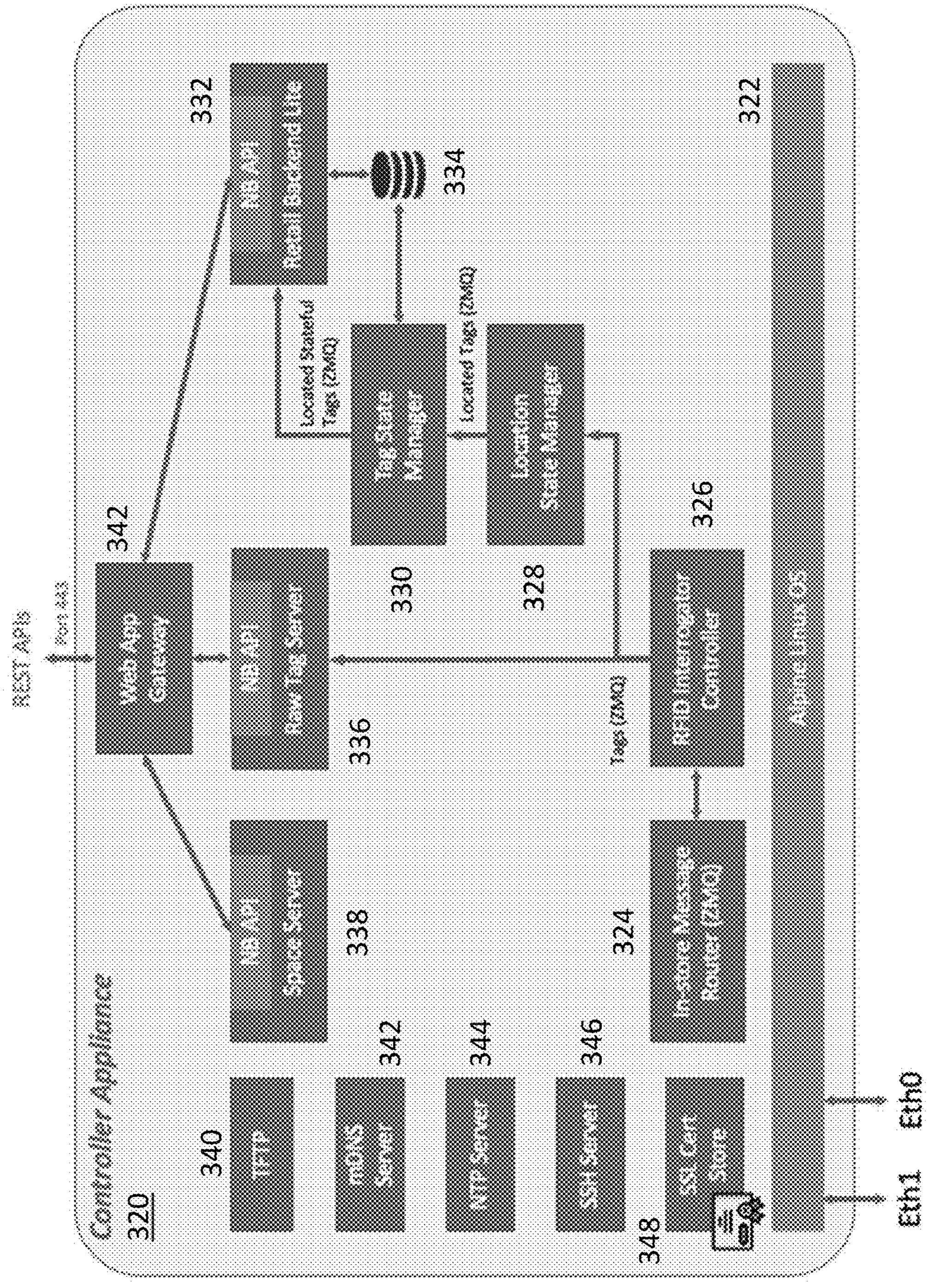
FIG. 3B is a block diagram of the controller appliance in the RFID tag monitoring system of FIG. 3A.
Figure 3C:
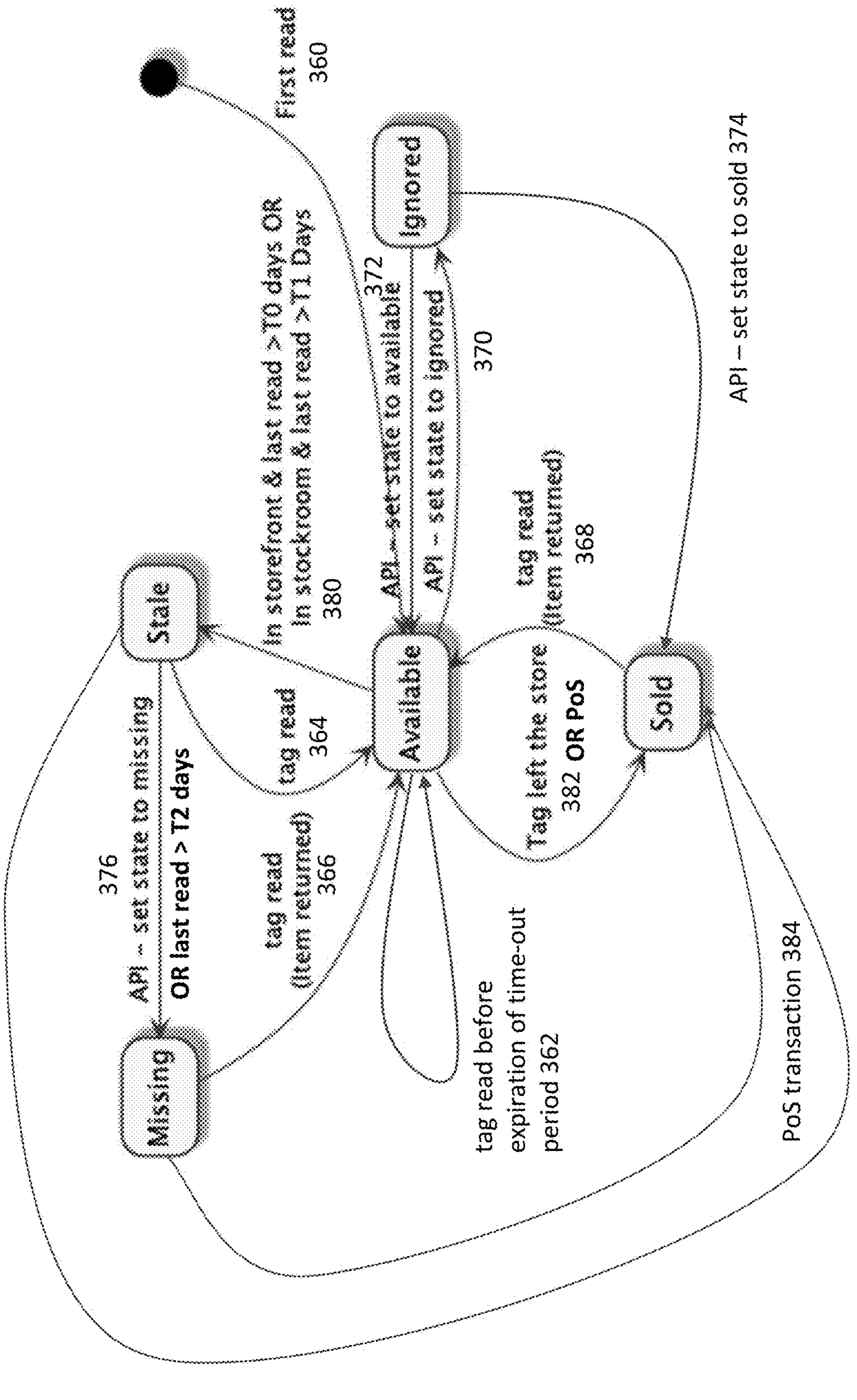
FIG. 3C is a diagram of the state transitions for RFID tags monitored with the RFID tag monitoring system of FIG. 3A.

FIGS. 3A-3C illustrate a system 300 that can monitor and locate passive RFID tags 312 with an accuracy of 99% or higher despite the tag detuning, tag shadowing, re-radiation cancelation, and temporary obstructions that may temporarily prevent certain RFID tags 312 from being read. This system 300 includes one or more RFID tag readers 310*a*-310*g* (collectively, readers 310), shown deployed in a retail clothing store in FIG. 3A. The readers 310, which are also called sensors or interrogators, are connected to a controller appliance 320, also called a system controller or controller, via respective Ethernet connections 314 or other suitable wired or wireless connections.

The readers 310 can be fixed in place, e.g., on or from the ceiling, to monitor different areas of the store. In this example, reader 310*a* monitors a shipping and receiving area 31, reader 310*b* monitors a stockroom 33, reader 310*c* monitors a hallway connecting the stockroom 33 to the sales floor/storefront 35, reader 310*d* monitors a changing room 37, and readers 310*c*-310*g* monitor the sales floor/storefront 35. For areas monitored by multiple readers 310, the readers 310 may be assigned to monitor zones or sub-areas within the larger area. In FIG. 3A, for instance, reader 310*e* covers a zone including a checkout counter 41 and point-of-sale (POS) 42, such as a cash register, and reader 310*g* is positioned to cover an entrance/exit zone 39.

In operation, the readers 310 scan the store for the RFID tags 312 affixed to items 314 for sale in the store. The readers 310 scan the store by transmitting wireless ultra-high frequency (UHF) interrogation signals (e.g., at carrier frequencies of 865-868 MHz or 902-928 MHZ) and detecting responses from the RFID tags 312. Antenna arrays in the readers 310 may sweep or scan the interrogation signals over different angular ranges and detect responses from tags 312 activated by those interrogation signals. In addition, the readers 310 can act in a coordinated fashion, for example, with one reader 310 activating an RFID tag 312 and all readers 310 within range detecting the RFID tag's response (e.g., as disclosed in International Application No. PCT/US2022/026198, which is incorporated herein by reference in its entirety for all purposes).

These scans may include quick, frequent scans of certain high-traffic areas, such as the entrance/exit zone 39 or checkout zone 41, when the store is open for business to detect tags 312 that are likely to have moved or changed state. Other scans may be longer, less frequent scans of the entire store, including the stockroom 35 and changing room 37, when the store is closed (e.g., during the night) to perform a complete inventory of all RFID tags 312, including those that are unlikely to have moved or changed state and those that have not responded to recent previous scans. The readers 310 may not detect every tag 312 with every scan. For instance, the reader 310*b* monitoring the stockroom 33 may not detect tags 312 on metal shelves 34. Similarly, the readers 310*e*-310*g* monitoring the sales floor 35 may not detect tags 312 on items 314 that are stacked on top of each other or tags 312 that are obscured by fixtures 36, such as shelving or furniture.

The readers 310 report the tag responses to the controller appliance 320, which is shown in greater detail in FIG. 3B. The controller appliance 320 can include one or more processors, non-volatile memories, and other logic devices implemented as integrated circuits and powered by appropriate power supplies and other housekeeping electronics. These processors and logic devices may include discrete components that perform discrete functions and/or more general-purpose components that are programmed to perform a variety of functions, either by themselves or in concert with other components of the controller appliance 320. For instance, the controller appliance 320 may include a central processor unit (CPU) 322 running an operating system (e.g., Alpine Linux OS) that manages the controller appliance's hardware and software resources, including communications interfaces, shown as Ethernet connections Eth0 and Eth1, connected to the readers 310, the POS system, and/or other devices. The controller appliance's non-volatile memory can store the operating system and other firmware and software as well as tag state information.

Fading Channels and Increased Scan Frequency for More Accurate Estimates

In a store, warehouse, or other space or environment where the readers 310 are deployed, there may be many objects that scatter the wireless radio-frequency (RF) signals that propagate between the readers 310 and the RFID tags. This means that the channels between the RFID tags and readers can be modeled or approximated using an appropriate statistical model, such as a model for a Rayleigh or Rician channel. If there are many objects that attenuate, reflect, or scatter the signal(s) such that there is no line of sight (LOS) path between the transmitter and receiver (i.e., between a reader and an RFID tag), then the channel can be modeled using Rayleigh fading, where the envelope of the channel response follows a Rayleigh distribution. In many cases, the signal travels from the transmitter (RFID tag) to the receiver (reader) via many paths simultaneously, with one or more paths changing (e.g., in length or loss) with time, and interfere at the receiver. If the signal arriving along one of those paths, typically the LOS path, is much stronger than the other signals, then the environment can be modeled using Rician or Ricean fading, which is a stochastic model for radio propagation anomaly caused by partial cancellation of a radio signal by itself. Rayleigh fading is sometimes considered Rician fading without an LOS signal.

Conversely, a Rayleigh channel is sometimes thought of as a Rician channel without an LOS signal. The Rician fading channel model has a factor that represents the ratio between the power in the LOS path to the total power of the reflected paths. A Rician channel devolves towards a Rayleigh channel as the strength of the LOS signal diminishes with respect to the total non-LOS signal power. If the factor goes to zero, the distribution becomes a Rayleigh distribution. In practice, the RFID system may experience both types of channels.

In a Rayleigh fading channel, moving an antenna by one-half of a wavelength or more generally produces statistically independent fading. In other words, in a Rayleigh fading channel, interrogating an RFID tag at a first location with a reader, moving the RFID tag from the first location to a second location about one-half a wavelength away (e.g., 16.4 cm at a carrier frequency of 915 MHz) from the first location or changing the RFID tag's orientation with respect to the reader, and interrogating the RFID tag at the second location or orientation with the reader produces two statistically independent measurements of the RFID tag. If each of these read opportunities has an independent, 80% chance of success, then both chances together yield a 96% chance that at least one read opportunity will produce a successful measurement (accurate location estimate). In other environments, the RFID tag may be stationary, but people or other objects moving at 1-2 meters/second cause changes in fading, leading to statistically independent measurements at a tag read rate of once every few seconds even though the RFID tag may not move. This implies that reading an RFID tag frequently (e.g., at a rate of once every one, two, three, four, or five seconds) in areas or zones where the RFID tag and/or other objects are likely to be moving (e.g., a sales floor) is more likely to yield at least one successful measurement or estimate of the RFID tag's location than reading an RFID tag in an area or zone where it is unlikely to be moving (e.g., a stockroom).

To take advantage of the statistical independence of measurements at slightly different relative locations, the readers 310 in the system 300 of FIG. 3A operate at different read rates depending on the nature of the RFID movement in their respective zones. The read rates and types also depend on the time of day/whether or not the store is open or operational. The read rates can be selected or optimized to read areas of tag motion, possibly without reading frequently or at all in areas with little to no tag motion. The sensor (readers) can be placed so that they better cover and isolate areas of foot/tag traffic (including exploiting beam steering).

If large numbers of items do not appear in the traffic paths, the readers can operate with lower Q parameters, which regulate the probability of a tag response. A reader commands tags receiving an interrogation signal to choose a random number between zero and $2^Q$-1 for selecting a time slot for responding to the interrogation signal. The reader then waits for $2^Q$ time slots before beginning the next sequence of transmitting an interrogation signal and waiting for tag replies. Each sequence is called a round and may be at the same carrier frequency (also known as a frequency hop or hop for short) or at a different carrier frequency for the interrogation signal. A larger value of Q decreases the probability of two tags responding during the same time slot, which is known as a collision. Reducing the Q parameter may increase the probability of a collision but allows a reader to read tags faster because there are fewer time slots for replies, so more rounds can be sent per hop or each hop can be shorter. For instance, if Q=5, there are a maximum of $2^5$=32 query slots, which can take much less time in total than the duration of a slow hop (e.g., 400 ms). And if the hop is shorter, the reader can scan frequencies faster, exploiting frequency diversity to improve likelihood of powering-up/receiving a tag reply.

In addition, reducing the reader transmit power above a traffic path reduces the number of tags being powered up to just those in or close to the traffic path (again, enabling a smaller Q and faster reads). If the Electronic Product Code (EPC) stored in the RFID tag of the item on the move is known, then the system 300 can directly track that specific RFID tag (EPC) through the use of the RFID SELECT command, eliminating contention among RFID tags activated by the reader(s) 310.

More specifically, some or all of the readers 310 may perform fast scans of high-traffic areas during open or operational hours (e.g., when sales associates and/or customers are in the store) to interrogate RFID tags that are likely to be moving. The readers 310 may also perform slow, deep scan to interrogate every RFID tag for inventory purposes when the RFID tags are unlikely to be moving, e.g., because the store is closed and/or no people are in the store. For instance, the reader 310*b* in the stockroom 33 may perform slow, deep scans of the RFID tags in the stockroom 33 at night, when the store is closed, to perform a complete inventory of the stockroom 33. The other readers, including the readers 310*d* in the sales floor 35 and changing room 37 may likewise perform slow, deep scans at night or when no people are in the store. During the slow, deep scan, each reader 310 reads RFID tags slowly, with more/finer pointing sectors and equal time devoted to interrogating each sector. Each reader 310 spends more time illuminating and receiving signals from each location. If desired, this means that the reader and RFID tag can operate at lower modulation rates (e.g., 80 kbps instead of 640 kbps) increasing the likelihood of detecting the RFID tag's response in the presence of noise. Each reader 310 can also change its transmission (interrogation signal) characteristics to excite each RFID tag with a higher chance of producing a detectable response or for a faster read/interrogation. This compensates, to some degree, for stacking or obstructions that reduce the chances of successfully interrogating an RFID tag.

During a deep scan, one or more readers 310 (e.g., two, three, four, or more readers 310) at a time may interrogate the RFID tags. For deep scanning, each reader 310 uses a large number of pointing sectors (e.g., one for each antenna element in the reader), with a higher elevation angle for each pointing sector to read RFID tags on shelves, racks, or other fixtures. For instance, the readers may use 135° and 155° elevation angles for deep and fast scans, respectively (where 180° points straight down from a ceiling-mounted reader to the floor). The readers may operate at 0°, 45°, 90°, 135°, . . . 315° azimuth angles for deep scan and 45°, 135°, 225° and 315° azimuth angles for fast scans, with (some) angles altered during fast scans for sensors covering special volumes, such as the ingress/egress zone and stockroom, to better exploit the activity in those volumes. The control appliance may account for these different elevation and azimuth angles by using different boxing techniques to eliminate poor position estimates. The control appliance may also remove outliers by comparing the detected positions to the illuminated positions; ideally, they should coincide instead of being widely separated.

During a fast scan, some or all of the readers scan areas where RFID tags are likely to be moved (frequently) by sales associates or customers, such as the sales floor 35, entrance/exit zone 39, check out zone 41 (aka a cashier zone), and hallway between the sales floor 35 and the stockroom 33. If the system includes cameras, it may use imagery from the cameras to detect movement (in general) or areas without fixtures and to target scans in areas with movement and/or areas without fixtures. For instance, the cameras may detect that a human is standing near a fixture and has picked up an item from the fixture. Since the system has an estimate of which items are on the fixture (or otherwise within the human's reach), it can target a scan to just those items so that only the tags on those items will respond to the interrogation signals. If this is a small set of tags, the system may use a smaller Q parameter for a more efficient, faster scan. Once the system has identified the tag on the move (i.e., picked up by the human), it can track that tag using the SELECT aspect of the RFID protocol over the rest of its journey through the store or space.

Alternatively, or in addition, the control appliance may direct the readers 310 to scan areas with pathways or other areas where customers and sales associates are likely to move (and to move RFID tags). Scanning for tags in areas without furniture, fixtures, or many other tags improves the chances of activating the tag and receiving a detectable response from the tag, in part because there is less contention among tags for responding at different (unique) time slots because there are fewer tags in the area being interrogated. In addition, fast, frequent reading of RFID tags in these areas increases the item detection rate given the movement of the RFID tags by sales associates and/or customers.

The scan parameters during a fast scan are typically different than those used in a slow, deep scan, and may even vary from reader to reader. For instance, in a fast scan, the scan repetition rate may be higher, the scan (hop) period may be lower (e.g., 30-50 ms instead of 400+ ms), the Q parameter may be lower, and there may be fewer scan angles and fewer, coarser scan sectors, with different time periods devoted to interrogating each sector. For instance, the reader 310*c* in the hallway may scan in only two directions (left and right in FIG. 3A). In addition, the readers may employ interrogation signals with different amplitude/power characteristics on the assumption that the sensor is closer to the likely location of the tag being interrogated. Even though a fast scan may be much shorter than a slow, deep scan, the fast scan may extend over or be repeated over a greater number and/or greater range of carrier frequencies for higher carrier diversity. In addition, multiple readers (e.g., three or more) may scan simultaneously during a fast scan, with each scanning a distinct section of the store. During a fast scan, the sensors may operate at different scan rates and/or duty cycles, with many short, fast scans by sensors over high-traffic areas (e.g., readers 310*c*, 310*e*, and 310*g*) and fewer scans by other sensors per instructions from the controller appliance 320.

Controller Appliance Architecture

FIG. 3B illustrates the controller appliance 320 as a block diagram, where each block represents a different function or sub-function performed by the controller appliance 320. To monitor and update tag states, the controller appliance 320 includes or implements an in-store message router 324, RFID interrogator controller (RFID-IC) 326, location state manager 328, tag state manager 330, and retail backend application programming interface (API) 332. The in-store message router 324 queues and routes messages exchanged between the readers 310 and RFID-IC 326 via the Ethernet connections 314. The RFID-IC 326 employs a split media access controller (MAC) design to handle messages exchanged with the readers 310, with a lower MAC layer implemented in the readers 310 and an upper MAC layer implemented in the RFID-IC 326. The lower MAC layer determines a timestamp and parameters, estimated from the RFID tag's backscattered response, useful for determining the tag's position. The upper MAC layer schedules hop transmissions and the general purpose of each hop. The lower MAC layer executes more time-critical functions, such as actually scheduling when to transmit commands and how to react to replies within a hop. A positioning layer comprising the RFID-IC and/or the reader(s) 310 calculates the RFID tag's position in a 3D coordinate system (e.g., Cartesian coordinates with an origin at a known location in the store or room) from data coming from the MAC and PHY layers. The messages from the reader 310 may also include data read from the RFID tag, including the RFID tag's EPC and other metadata.

The location state manager 328 and tag state manager 330 track the RFID tag's location and state, respectively. The location state manager 328 receives the RFID tag's estimated location from the RFID-IC 326 (e.g., in a Cartesian coordinate frame with the origin at one corner of the store) and determines the room and zone in the store in which the RFID tag is located. The rooms and zones may be extracted from a 3D model of the store or space. In FIG. 3A, the rooms include the receiving area 31, stockroom 33, sales floor 35, and changing room 37, with the sales floor 35 further divided into an entrance/exit zone 39 and a checkout zone 41. The location state manager 328 updates each RFID tag's location in an inventory database 334, which may be hosted locally or off site (e.g., in the cloud), based on changes in location detected by the reader(s) 310.

The tag state manager 330 manages the tag's state, including its location and availability, according to the state diagram shown in FIG. 3C and described below in greater detail. There are several possible availability states, including but not limited to: (1) available; (2) stale (optional); (3) ignored; (4) missing; and/or (5) sold. There may be other states as well. These states and transitions between these states are described in greater detail below. The tag state manager 330 transitions the RFID tags 312 among these states based on the tags' responses (or lack of responses) to queries from the readers 310, including information about the tags' locations, and on the tag states stored in the inventory database 334. The tag state manager 330 updates the tag states stored in the inventory database 334 and forwards both the tag state and tag location estimate to the retail backend lite API 332, which implements the backend functions for inventory, restocking, and product lookup 332. The retail backend lite API 332 can implement these functions via a web app gateway 342, which implements a Hypertext Transfer Protocol (HTTP) proxy, redirecting Representational State Transfer (REST) requests to the appropriate backend server (not shown). The web app gateway 342 can also provide user authentication and authorization and serves the static files used by browsers to render web pages.

FIG. 3B also shows several optional components of the controller appliance 320, including a space server 338, raw tag server 336, Trivial File Transfer Protocol (TFTP) server 340, Network Time Protocol (NTP) server 344, multicast Domain Name Service (mDNS) server 342, Secure Shell (SSH) server 346, and Secure Sockets Layer (SSL) certificate store 348. The space server 338 handles firmware lifecycle management and configuration of the sensors 310 and Power-over-Ethernet (PoE++) switches (not shown) that connect the controller appliance 320 to the sensors 310. The raw tag server 336 retrieves tag metadata for legacy APIs, such as those used by API clients for system debugging. When they boot, the sensors 310 download executable images from the TFTP Server. The NTP server 344 connects and synchronizes with a remote (e.g., Internet-based) NTP server and provides NTP service to the sensors 310. The mDNS server 342 enables the controller appliance 320 to advertise itself using the mDNS and DNS-SD protocols, e.g., for during debugging. The SSH server 346 is also used for debugging. And the SSL certificate store 348 hosts the server certificates used by the sensors 310 and the web-server certificate used by the REST clients to authenticate the controller appliance 320.

Stateful Inventory Tracking

Together, the location state manager 328, tag state manager 330, and inventory database 324 in the controller appliance 320 track the state of each RFID tag based on tag responses (or lack of responses) detected by the sensors 310. The tag state includes two variables: the tag's location state and its availability state. The location state includes the tag's last estimated position (e.g., in two- or three-dimensional Cartesian coordinates), a timestamp for the last position update, an estimate of the error in the estimated position (e.g., $\in_x$, $\in_y$, $\in_z$), and, optionally, a flag indicating whether or not the tag and associated item are in the stockroom. A sales manager, sales associate, or other user can view the tag's state, including the availability and location state variables, with a browser or app running on a computer, tablet, smartphone, or other device that queries the controller appliance 320 via a REST API or other suitable interface or API that makes inventory data available. The sensors 310 and/or RFID-IC 326 produce the estimated position, time-stamp, and error estimate from the RFID tags' responses to the interrogation signals from the sensors 310. The location state manager 328 maps each estimated position to the rooms and, if applicable, zones in the store, and sets or resets the optional stockroom flag, then appends this information to the tag read event and forwards the event to tag state manager 330.

The tag state manager 330 is responsible for maintaining each RFID tag's availability state according to the state transition diagram in FIG. 3C. As shown in FIG. 3C, the tag has five possible availability states: (1) available, indicating that the item associated with the tag is available for sale; (2) sold, indicating that the item associated with the tag has left the store and is deemed as sold or that the POS system has transacted and/or recorded sale of the item; (3) ignored, indicating that the item associated with the tag is no longer part of the inventory, e.g., because the tag was attached to the wrong item or because the item has been damaged and is unfit for sale; (4) stale, indicating that the tag has not been read within a predetermined time-out period (e.g., minutes, hours, days, or weeks, depending on the item and/or the zone in which the tag was last read); and (5) missing, indicating that a sales associate has searched for an item associated with a stale tag and could not find the item in the store. There may be other states as well, including but not limited to stolen, broken, reserved for pickup or exchange (e.g., in response to an on-line sale or exchange transaction), and/or custom states, that can be used to represent items or tags that have been stolen, destroyed, or otherwise manipulated.

When a sensor 310 reads a tag 312 for the first time (360), the tag state manager 330 creates a record for the tag 312, including a timestamp indicating when the tag 312 was first detected, and the associated item and enters that record into the inventory database 334. In response to creating the record, the tag state manager 330 sets the tag's availability state variable to available. If the readers 310 continue to detect responses from the tag 312 during subsequent scans (the tag 312 is read before the time-out period expires 362), the location manager 328 updates the location state variable as appropriate and tag state manager 330 keeps the tag's availability state variable as available. If a sales associate or other user determines that the item associated with the tag is incorrect or otherwise unsuitable for sale, then the sales associate sets the tag's availability state variable to ignored by accessing an API (370) with an app on a smartphone, tablet, or other suitable computing device. (This can happen during the receiving process, when the sales associate checks the shipping manifest against the actual items received.) The tag state manager 330 keeps the tag's availability state variable as ignored unless the sales associate or another user changes the tag's availability state variable to available (372), sold (374), or missing (376) using the API. The sales associate or user can use the API to force a transition between any pair of tag states, including the ones shown in FIG. 3C.

If the readers 310 fail to detect a response from the tag 312 over a predetermined timeout period and/or after a predetermined number of scans, then the tag state manager 328 sets the tag's availability state variable to stale (380). The duration of the timeout period and/or number of scans may vary depending on the tag's last estimated location: if the tag was last read in the stockroom, for instance, then the predetermined timeout period may be 7 days versus 3 days if the tag was last read on the sales floor. The tag state manager 330 does not remove the tag or the associated item from the inventory in response to this state change even though the tag 312 has not been read, possibly for an extended period (e.g., a week or longer). Put differently, being stale does not mean that the tag or the associated item has been removed from inventory. It just means that the tag 312 has not been read for at least as long as the timeout period, possibly because the tag 312 is on metal shelving or stacked in a pile close to other tags (e.g., within 1, 2, 5, or 10 cm of other tags).

If one or more of the readers 310 receives a response from a tag 312 with a stale availability state variable, then the location state manager 328 updates the tag's location availability variable and the tag state manager 330 changes the tag's state availability variable from stale to available (364). If a sales associate searches for the tag and associated item, e.g., based on the tag's last estimated position, but cannot find the tag or associated item, then the sales associate can change the tag's state availability variable from stale to missing via an API (376). If someone later finds the tag and associated item, they can change the tag's state availability variable from missing to available via the API.

A tag can also be transitioned automatically from stale to missing based on a timeout condition specific to the area of the store where the tag went stale. For instance, no tag should persist near the checkout beyond the store's operating hours, so stale tags near the checkout may be set to missing after predetermined timeout period, e.g., 6, 12, 18, or 24 hours. Typically, a store's inventory will turnover completely at some multi-month interval (e.g., 1, 2, or 3 months), so stale tags on the sales floor can be set to missing after being stale for that multi-month interval to avoid keeping stale tags that have been removed (e.g., due to uncaught thefts) from persisting in the inventory forever.

The tag state manager changes the tag's state availability variable to sold (382) in response to a positive indication that the item associated with the tag has been purchased. (Failing to read a tag for a given period or number of scans causes the tag's state to change to stale, not sold.) This positive indication can include a sale transacted with the POS 42 (384) or detection of the tag 312 moving out of the store by the reader 310*g* monitoring the entrance/exit zone 39. For instance, a customer may purchase an item at the checkout 41, in which case a sales associate rings up the sale on the POS 42. The customer then carries the purchased item out of the store. The tag state manager 330 receives an indication of the sale from the POS 42 via an API and changes the tag's state availability variable to sold, even if the tag was missing or stale. If the tag is still active, the readers 310*e*-310*g* detect the tag moving out of the store, in which case the location state manager 328 determines that the tag is moving out of the store and the tag state manager 330 changes the tag's state availability variable to sold.

The tag state for the object can go from stale or missing to sold directly based on POS data even if the tag was not read during checkout. For example, a sale transacted at the POS 42 can trigger a transition in the tag state from stale or missing directly to sold. In the absence of this change in tag state, a stale tag would have to be read as it is leaving the store to be marked as sold, which means that the tag's state would transition from stale to available to sold instead of directly from stale to sold.

Once the tag's state availability variable changes to sold, the tag and associated item can be removed from the inventory database 334 or kept at least temporarily for running sales and inventory reports before being purged to prevent the inventory database from growing too large. If the customer returns the item, then tag and associated item are restored to the inventory when the tag is read by an RFID reader, with the tag's state availability variable set to available (368). Similarly, if a reader receives a response from a missing tag, then the tag's state availability variable is set to available (366).

If desired, the tag state manager 330 can maintain a history of recent tag state transitions for each and every RFID tag. This transition history can include timestamps indicating the times at which the state transitions occurred. This can be useful for system debugging.

Inventory Web Application

Sales associates, sales managers, and other users can view the inventory database 334 via an inventory web application on a computer, tablet, smartphone, or other device that connects to the controller appliance 320 via the internet or another computer network or connection (e.g., a direct WiFi or Ethernet connection). Sales associates, sales managers, and other users can query the inventory database 334 using different APIs. These APIs may enable the user to query the inventory database 334 for the complete inventory, for items or units that meet a certain criterion or set of criteria (e.g., unit color or size or tag state), or unit history.

Using the inventory web application and/or APIs, a user can retrieve and view a list of items and associated RFID tags and the states of the associated RFID tags, including the location and availability state variables. The user can view the items in inventory by row or column, with entries for the location and availability state variables, including the room where the item is (estimated to be) located, and counts of items, by type, on the sales floor and in the stockroom. The user can sort, filter, and rearrange the items in these views, e.g., by item type, item color, item size, item stock keeping unit (SKU) number, RFID EPC, location, availability state variable, etc. These counts are especially useful when receiving shipments of new items and adding those items and the associated RFID tags to the inventory in the database. The inventory web application also allows users to view state transition times, location times, and histories showing how long a particular item spent in different states and/or locations. The user can also change an item's status, e.g., to missing or sold, using the inventory web application.

Confidence Metrics for Estimated Tag Locations

In addition to managing the location state variable, the location manager 328, retail backend lite server, or other processor can also manage a separate confidence metric or level. The confidence metric can be a separate number that represents the likelihood that an item or RFID tag is still at its last known location (after the passing of time since the last tag read). When an RIFD tag is read, the RFID-IC develops both a position estimate and an error estimate; after some time passes, if the tag hasn't been moved, then the position/error should still be valid. But if a lot of time has passed, then maybe the tag was moved, but somehow the system missed it. Put differently, the confidence metric represents the probability that an RFID tag and the associated item are actually located at the RFID tag's (last) estimated location. This confidence metric can be another entry in the location state variable or a separate, optional parameter or variable. The confidence metric can be calculated and displayed in a quantitative fashion, a qualitative fashion, or both a quantitative and qualitative fashion. For instance, it can be a numerical value, e.g., on a scale of 0 indicating no confidence to 1 indicating perfect confidence, or a qualitative value, e.g., excellent, good, fair, or poor. Qualitative values can be linked to quantitative values (e.g., excellent may correspond to a numerical confidence of 0.76-1.0, good may correspond to a numerical confidence of 0.51-0.75, and so on).

The confidence metric may depend in part on the tag's status (e.g., available versus stale) and on the tag's last estimated position. The confidence level or metric may have little to no meaning if the tag is in the ignored state, missing state, or sold state. The confidence level may degrade with time since its last detected response, e.g., in an exponential or stepwise fashion. If the tag was last detected in the stockroom, for instance, it may have a relatively high confidence metric even though its status may be stale. On the other hand, if the tag has been located in a high-traffic room or zone, such as the receiving area 31, entrance/exit zone 39, or checkout zone 41, for a longer than normal period of time, then the confidence metric may be low even if the tag's status is available.

TABLE 1 (below) shows one way of computing or assigning a confidence metric to an RFID tag based on the time T since the tag was last read by a sensor. The times in TABLE 1 are examples and should not be taken as limiting; other times are also possible. This time varies with the tag's last estimated position: it is the longest for tags in the stockroom and shortest for tags in temporary zones, such as the receiving area, checkout zone, and entrance/exit zone. It can go up to hours or days for the stockroom, minutes to hours for the sales floor, and seconds to minutes for the temporary zones.

TABLE 1

| | Confidence Metric given time (T) since Last Known Volume | | | |
|---|---|---|---|---|
| Volume | Excellent | Good | Fair | Poor |
| Stockroom | T < 1 day | 1 d ≤ T < 2 d | 2 d ≤ T < 5 d | T ≥ 5 d |
| Storefront | T < 1 minute | 1 m ≤ T < 5 m | 5 m ≤ T < 15 m | T ≥ 15 m |
| Temporary Vol. | T < 10 seconds | 10 s ≤ T < 20 s | 20 s ≤ T < 30 s | T ≥ 30 s |

The inventory web application may depict the confidence metric to a sales associate or other user via a graphical user interface (GUI) displayed on a computer, tablet, or laptop. For instance, if the GUI shows a tag's (last) estimated location as a dot superimposed on a floor plan of the store, the color of the dot may reflect the confidence metric, e.g., with green or blue representing higher confidence levels and yellow, orange, or red indicating lower confidence levels. The shading can be discrete or graded, depending on the range or scale of confidence levels, with an additional icon, text, or other indication (e.g., for poor confidence levels) indicating when the tag was last read/detected. The GUI may also depict the estimated error in the tag's estimated location as the size or radius of the dot, with larger dots indicating larger estimated errors. The shape or opacity of the dot may indicate whether the tag is in an available (opaque) or stale (translucent) state.

A sales associate can use the tag state and confidence metric to locate items quickly and efficiently, e.g., for stocking, restocking, or fulfilling customer requests. Suppose, for instance, that a customer is looking for a shirt in the next size up or in a different color. A sales associate can query the inventory database 334 via the inventory web application to see if that item is in stock and, if so, its estimated location, together with a confidence metric and uncertainty (radius of error estimate). If there are multiple copies of the item in stock, then the GUI can show all of the items along with visual indications of the associated confidence metrics and error estimates. The sales associate can then pick and stock the item that is closest and/or has the highest confidence metric and lowest error estimate. A sales associate may interpret an estimated location with a poor confidence metric as an unlikely location to find the item but a reasonable position to begin a search for the item as part of a process for determining if the item is missing. The GUI shows items associated with both available and stale RFID tags, allowing the sales associate to locate and retrieve items that may be stacked on metal shelves, in tall piles, or temporarily obstructed from the readers 310 by fixtures or other objects.

Example Stateful Inventory Tracking Scenario

Figure 4:
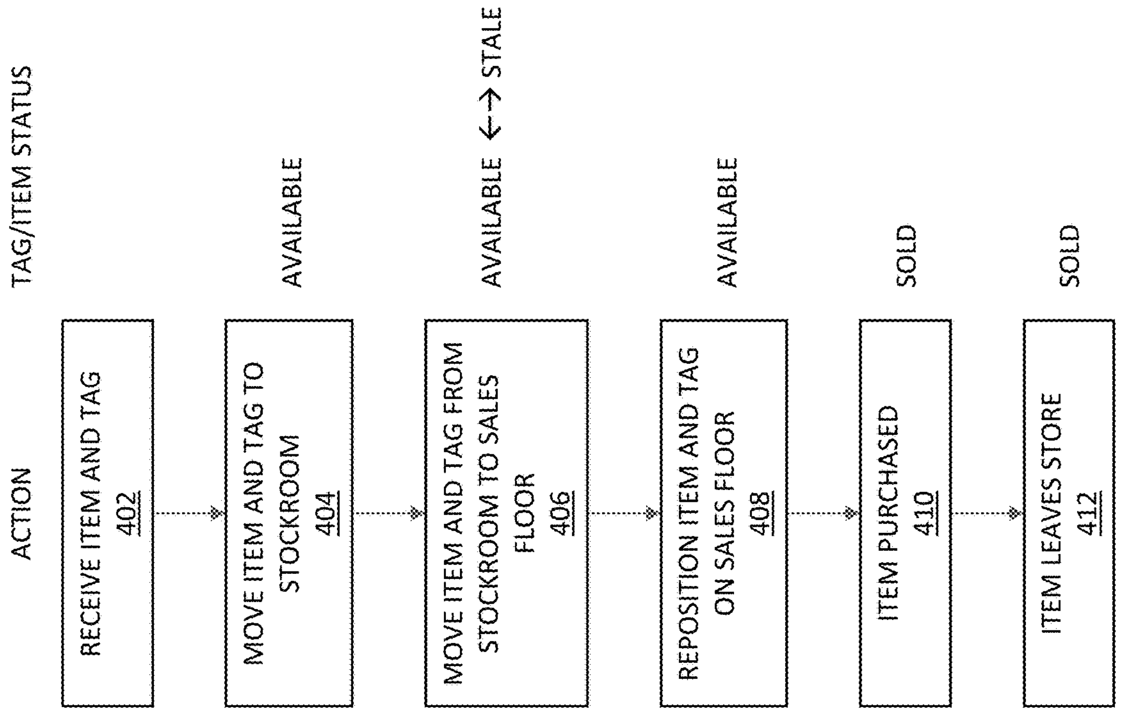
FIG. 4 illustrates a process for receiving and monitoring items with RFID tags.

FIG. 4 illustrates an example lifecycle for an RFID tag affixed to an item sold in a store like the one shown in FIG. 3A, starting with receiving (402). The item arrives at the store. A sales associate removes the item from its shipping material and reads the affixed RFID tag with a handheld or fixed reader, which records the tag's response, including its EPC. The controller appliance coupled to the reader adds a new record to the inventory database for the tag with information about the item and initializes the tag's state to available. (If there is no RFID tag affixed to the item, the sales associates affixes an RFID tag to the item before reading the RFID tag with the reader; similarly, if the reading the RFID tag does not automatically add the RFID tag or item to the inventory, then the sales associate can add them to inventory manually.) The sales associate compares the item information gleaned from the tag's EPC in the inventory database to the shipping manifest; if there is a mismatch, then the sales associate may set the tag's state to ignored and set the item aside.

Once the item has been received and successfully added to the inventory database, the sales associate can move the item and tag to the stockroom (404). The readers may sense this transition from changes in the tag's estimated location as tag moves to the stockroom. In the stockroom, the sales associate may place the item in a large stack of items, on metal shelves, etc. This may cause the tag to "disappear," that is, the readers may not be able to read the tag effectively due to interference from nearby tags or metal as described above. If the readers stop reading the tag, then the tag and associated item remain in inventory, albeit with a status that is eventually changed from available to stale.

For instance, suppose that a stockroom shelf has 10 items of a particular SKU. If a shipment arrives with 10 more items of the SKU, the sales associate may stack the new items on the old items in a stack that is 20 items tall, even though the sensors can read at most 16 items in the stack, causing at least four items to stop emitting detectable responses. All 20 items remain in inventory, with the "disappeared" items eventually having stale states and the other items having available states.

Eventually, the sales associate moves the item from the stockroom to the sales floor (406). The RFID tag readers may scan the hallway or other space between the stockroom and the sales floor frequently as described above and detect the tag or simply detect the tag once it has reached the sales floor. In either case, the controller appliance updates the tag's location state and, if applicable, changes the tag's availability state from stale to available. From time to time, sales associates and/or customers may move or reposition the item and tag on the sales floor (408), e.g., as customers try them on, other items are moved or purchased, or the sales displays are rearranged. As this occurs, the item and tag are scanned frequently to detect changes in their position(s). The item and tag may also be stacked with other items and tags such that the tag is no longer readable, in which case the tag's state eventually transitions from available to stale. Even if the tag is unreadable, the controller appliance keeps the item in the inventory database, albeit in a stale state. When the tag becomes readable again, the controller appliance changes the tag's state back to available.

When a customer buys the item (410) and/or takes the item out of the store (412), the controller appliance changes the item's state to sold and may eventually remove the item from (potentially) available inventory in the inventory database. More specifically, the controller appliance changes the item's state to sold in response to receiving a message from a POS system saying that the item has been sold and/or to the readers sensing the associated tag following a trajectory leaving the store or outside the store. This may trigger restocking of the item from the stockroom and/or ordering replacement items.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of tracking items associated with respective radio-frequency identification (RFID) tags entering and exiting a store with an inventory database storing availability and location states of the RFID tags, the availability states including an available state indicating that an item associated with a corresponding RFID tag is available for sale, a stale state indicating that at least a predetermined time period has elapsed since the corresponding RFID tag has responded to an interrogation signal, and a sold state indicating that the item associated with the corresponding RFID tag has been sold and/or removed from the store, and the location state including an estimated location of the corresponding RFID tag, the method comprising:

in response to detecting a response from an RFID tag to a first interrogation signal, setting the availability state of the RFID tag to the available state, determining the estimated location of the RFID tag based on the response to the first interrogation signal, and storing the estimated location of the RFID tag;

in response to failing to detect a response from the RFID tag in the available state to a first-second interrogation signal, changing the availability state of the RFID tag to the stale state and maintaining the stored estimated location of the RFID tag;

in response to detecting a response from the RFID tag to a third interrogation signal, changing the availability state of the RFID tag from the stale state to the available state and updating the estimated location of the RFID tag based on the response from the RFID tag to the third interrogation signal; and in response to detecting a sale of an item associated with the RFID tag and/or movement of the RFID tag out of the store, changing the availability state of the RFID tag to the sold state.

2. The method of claim 1, wherein the location state of the RFID tag further comprises an error associated with the estimated location of the RFID tag and a timestamp associated with a last detected response from the RFID tag.

3. The method of claim 2, wherein the predetermined time period is based on the estimated location of the RFID tag.

4. The method of claim 2, wherein the predetermined time period is based on a last detected response from the RFID tag.

5. The method of claim 1, further comprising:

creating an entry in the inventory database for the item associated with the RFID tag in response to detecting the RFID tag at a receiving area of the store, the entry comprising an Electronic Product Code (EPC) stored in a memory of the RFID tag, the EPC representing the item associated with the RFID tag.

6. The method of claim 5, further comprising:

verifying that the EPC correctly represents the item associated with the RFID tag.

7. The method of claim 1, wherein detecting the sale of the item comprises updating a point-of-sale (POS) system to reflect that the item has been sold.

8. The method of claim 1, wherein detecting the sale of the item comprises transacting the sale of the item with a point-of-sale (POS) system.

9. The method of claim 1, wherein detecting the sale of the item comprises detecting that the RFID tag has been removed from the store.

10. The method of claim 1, further comprising:

disposing the item so as to prevent the RFID tag from producing a detectable response to the second interrogation signal.

11. The method of claim 1, further comprising:
placing the item in a stack of items that prevents the RFID tag from producing a detectable response to the second interrogation signal.

12. The method of claim 1, further comprising:
in response to receiving an indication that another item associated with another RFID tag is no longer part of an inventory tracked with the inventory database, changing the availability state of the other RFID tag to an ignored state.

13. The method of claim 1, further comprising:
in response to receiving an indication that another item associated with another RFID tag cannot be found, changing the availability state of other RFID tag to a missing state.

14. The method of claim 1, further comprising:
keeping the RFID tag in the inventory database in the stale state despite failing to detect the response from an RFID tag in the available state to the second interrogation signal.

15. The method of claim 1, further comprising:
transitioning the availability state of the RFID tag in response to a command received via an application programming interface (API).

16. A controller appliance for monitoring availability and location states of radio-frequency identification (RFID) tags, the availability states including an available state indicating that an item associated with a corresponding RFID tag is available for sale, a stale state indicating that at least a predetermined time period has elapsed since the corresponding RFID tag has responded to an interrogation signal, and a sold state indicating that the item associated with the corresponding RFID tag has been sold, and the location state including the corresponding RFID tag's last estimated location, the controller appliance comprising:
a communications interface configured to communicate with at least one RFID tag reader and with an inventory database storing the availability and location states of RFID tags;
a processor operably coupled to the communications interface; and
a non-volatile memory operably coupled to the processor and storing instructions which, when executed by the processor, cause the processor to update the availability and location states of RFID tags based on responses from the RFID tags to interrogation signals from the at least one RFID tag reader and failures by the RFID tags to respond to the interrogation signals from the at least one RFID tag reader, including maintaining an RFID tag's last estimated location when the availability state of the RFID tag is updated from the available state to the stale state.

17. A system for monitoring radio-frequency identification (RFID) tags in a store, the system comprising:
a plurality of RFID tag readers to transmit interrogation signals to RFID tags and to receive responses from the RFID tags to the interrogation signals; and
a controller appliance, operably coupled to the plurality of RFID tag readers, to update availability and location states of RFID tags based on the responses from the RFID tags, the availability states including an available state indicating that an item associated with a corresponding RFID tag is available for sale, a stale state indicating that at least a predetermined time period has elapsed since the corresponding RFID tag has responded to an interrogation signal, and a sold state indicating that the item associated with the corresponding RFID tag has been sold, and the location states including an estimated location of the corresponding RFID tag, wherein the estimated location of a first RFID tag in the available state is maintained when the availability state of the first RFID tag is updated from the available state to the stale state.

18. The system of claim 17, wherein the plurality of RFID tag readers is configured to change a rate of transmitting the interrogation signals based on a time of day.

19. The system of claim 17, wherein the plurality of RFID tag readers comprises:
a first RFID tag reader configured to monitor a first zone of the store; and
a second RFID tag reader configured to monitor a second zone of the store.

20. The system of claim 19, wherein the first RFID tag reader is configured to emit first interrogation signals at a first rate and the second RFID tag reader is configured to emit second interrogation signals at a second rate different than the first rate.

21. The system of claim 19, wherein the first RFID tag reader is configured to emit first interrogation signals at a first power level and the second RFID tag reader is configured to emit second interrogation signals at a second power level different than the first power level.

22. The system of claim 19, wherein the first RFID tag reader is configured to emit first interrogation signals at a first Q parameter and the second RFID tag reader is configured to emit second interrogation signals at a second Q parameter different than the first Q parameter.

23. The system of claim 19, wherein the first zone includes a shipping/receiving area of the store and the second zone comprises an entrance/exit of the store.

24. The system of claim 17, wherein the location state of the corresponding RFID tag further comprises an error associated with the estimated location of the corresponding RFID tag and a timestamp associated with a last detected response from the corresponding RFID tag.

25. The system of claim 17, wherein the predetermined time period is based on the estimated location of the corresponding RFID tag.

26. The system of claim 24, wherein the predetermined time period is based on a last detected response from the corresponding RFID tag.

27. The system of claim 17, wherein the controller appliance is configured to transition an RFID tag to the sold state in response to an indication from at least one of the plurality of RFID tag readers that the RFID has been physically removed from the store.

28. The system of claim 17, wherein the controller appliance is communicatively coupled to a point-of-sale (POS) system and configured to transition the corresponding RFID tag to the sold state in response to an indication from the POS system that the item has been sold.

29. The system of claim 17, wherein the controller appliance is configured to transition the availability state of an RFID tag in response to a command received via an application programming interface (API).

30. The system of claim 17, wherein the controller appliance is configured to transition the availability state of the corresponding RFID tag from the stale state to the sold state in response to an indication that the item associated with the corresponding RFID tag has been sold.

31. The system of claim 17, wherein the controller appliance is configured to transition the availability state of the corresponding RFID tag from a missing state indicating that the item associated with the corresponding RFID tag is missing to the sold state in response to an indication that the item associated with the corresponding RFID tag has been sold.

32. The system of claim 17, wherein the controller appliance is configured to keep an RFID tag in an inventory database in the stale state and to keep the associated estimated position despite the plurality of RFID tag readers failing to detect responses from the RFID tag.

33. A method of tracking items associated with respective radio-frequency identification (RFID) tags entering and exiting a store with an inventory database storing states of the RFID tags, the states including an available state indicating that an item associated with a corresponding RFID tag is available for sale, a stale state indicating that a predetermined time period has elapsed since the corresponding RFID tag has responded to an interrogation signal, and a sold state indicating that the item associated with the corresponding RFID tag has been sold and/or removed from the store, the method comprising:

transmitting, by at least one RFID tag reader, a first interrogation signal to a first RFID tag;

detecting, by the at least one RFID tag reader, a response from the first RFID tag to the first interrogation signal;

estimating a position of the first RFID tag based at least in part on the response to the first interrogation signal;

in response to detecting the response from the first RFID tag to the first interrogation signal, updating a state of the first RFID tag in the inventory database to the available state and to indicate the position of the first RFID tag;

disposing the first RFID tag within 20 centimeters of a second RFID tag;

transmitting, by the at least one RFID tag reader, a second interrogation signal to the first RFID tag with the at least one RFID tag reader;

failing to detect any response from the first RFID tag to the second interrogation signal due to tag shadowing, tag detuning, and/or re-radiation cancellation caused by the second RFID tag;

in response to failing to detect any response from the first RFID tag to the second interrogation signal, changing the state of the first RFID tag in the inventory database from the available state to the stale state and maintaining in the inventory database the estimated position of the first RFID tag;

transmitting, by the at least one RFID tag reader, a third interrogation signal to the first RFID tag;

detecting, by the at least one RFID tag reader, a response from the first RFID tag to the third interrogation signal; and in response to detecting the response from the first RFID tag to the third interrogation signal, changing the state of the first RFID tag in the inventory database from the stale state to the available state and updating in the inventory database the estimated position of the first RFID tag based on the response from the first RFID tag to the third interrogation signal.

34. The method of claim 33, wherein disposing the first RFID tag within 20 centimeters of the second RFID tag comprises stacking an item associated with the first RFID tag on an item associated with the second RFID tag.

35. The method of claim 1, wherein interrogations of the RFID tags are performed at a frequency based on stored state information indicating that one or more RFID tags may have moved or transitioned between states.

36. The method of claim 1, further comprising triggering a search for the RFID tag while the RFID tag is in the stale state based on the maintained estimated position of the RFID tag.

* * * * *